United States Patent Office

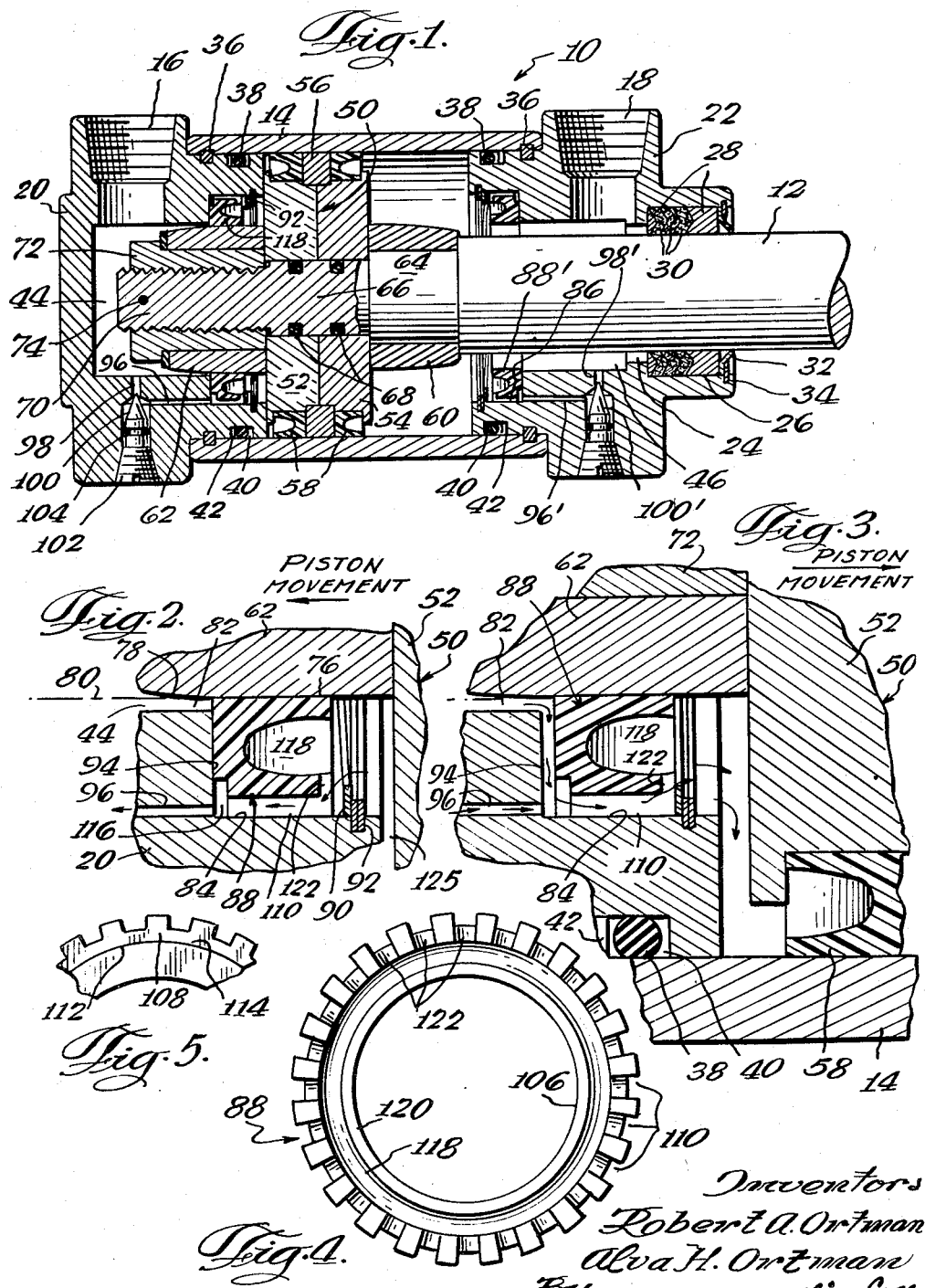

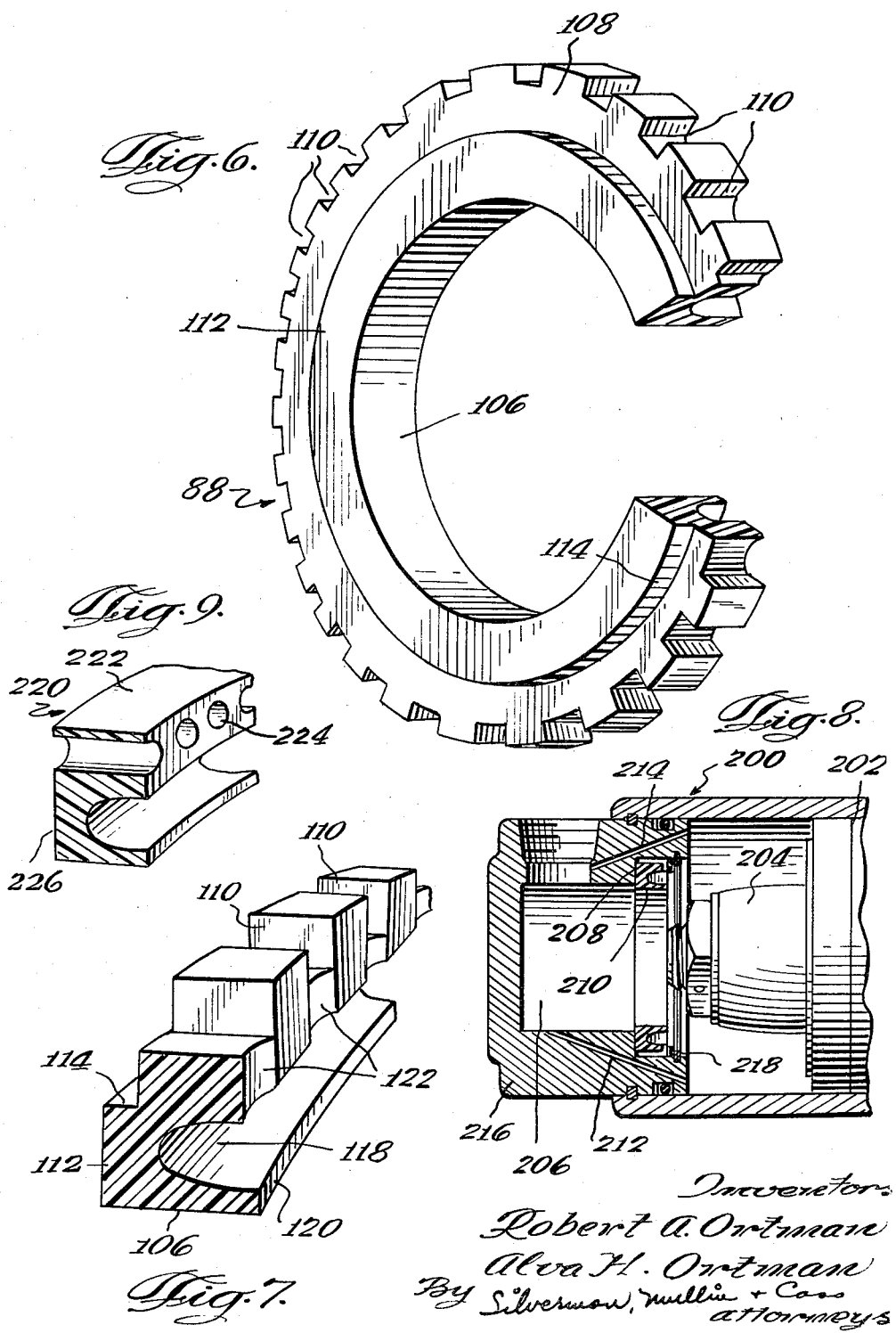

2,935,047
CUSHIONED CYLINDER CONSTRUCTION

Robert A. Ortman, Hammond, and Alva H. Ortman, Crown Point, Ind., assignors to Ortman-Miller Machine Co., Inc., Hammond, Ind., a corporation of Indiana Application August 2, 1957, Serial No. 675,967

9 Claims. (Cl. 121—38)

This invention relates generally to cylinders whose purpose it is to convert fluid pressure into a mechanical translative power movement for various purposes. Specifically, the invention is concerned with a construction of such a cylinder which has means for cushioning the movement of the piston at the end of the stroke to avoid or substantially lessen the impact of said piston against the head upon reaching the end of the cylinder.

The invention is applicable to double acting or single action cylinders, that is—in cases where there is a power stroke in one direction or in both directions. In either event the piston reciprocates within the cylinder and is cushioned at the end of its power stroke or strokes, as the case may be.

Structures for providing cushioning or shock-absorbing action for moving pistons in cylinders are well known but have had many disadvantages which this invention eliminates. For example, some prior structures require the use of ball check valves which are expensive; some have floating collars with unusual gasket structures and are relatively complex to produce and cannot be adjusted for varying conditions; some have complicated valving arrangements requiring special piston construction with rings and fine tolerances; some use flexible tapered lip members which wear excessively and are difficult to assemble and replace.

A further object of this invention is to provide a novel cushioned cylinder construction which requires a minimum of parts over the uncushioned cylinder construction; which utilizes a highly simplified and economical cylinder and piston construction; and which is positive operating and fool-proof.

Still a further object of the invention is to provide, in a cushioned cylinder construction, a novel relatively stiff ring of plastic material which is engaged by the piston nose when the piston reaches the end of its power stroke and which moves to throttle the flow of fluid from the cylinder end, and which is moved relative the piston nose in the opposite direction when the fluid pressure is reversed for the purpose of driving the piston back in its stroke, thereby freely admitting fluid into the cylinder.

Other objects of the invention will occur to those skilled in this art as the description thereof proceeds, and it will be seen from the detailed description of a preferred embodiment and the illustrations thereof, that considerable modification is capable of being made without in any way departing from the spirit of the invention.

In the drawings:

Fig. 1 is a sectional view through a double acting cylinder which is constructed in accordance with the invention to provide cushioning means at the blind end of the cylinder as well as the rod end thereof.

Figs. 2 and 3 are fragmentary sectional views through the cushioning structure on an enlarged scale to show the operation thereof.

Fig. 4 is an end-on elevational view of the valve ring of the invention showing the inner face thereof which is juxtaposed relative the piston.

Fig. 5 is a fragmentary elevational view of the outer face of the valve ring.

Fig. 6 is an enlarged perspective view of the valve ring from the outer face thereof with a portion broken away to show the sectional construction.

Fig. 7 is another perspective view of a fragment of the valve ring to better illustrate the inner face thereof.

Fig. 8 is a sectional view through the blind end of a cylinder of modified construction using a valve ring of modified construction.

Fig. 9 is a view similar to that of Fig. 7, but of a modified form of valve ring.

The invention is characterized by the provision of a novel valve ring, which is preferably formed of a synthetic plastic material impervious to the fluids usually associated with this type of cylinder, by means of which the desired cushioning occurs. The valve ring is adapted to be moved axially a very short distance, in one direction by the nose of the piston as it completes its power stroke, and in the other direction by the application of fluid pressure through reversal of fluid flow after it is desired to reciprocate the piston in the opposite direction.

In its first movement described above, the ring is tightly engaged upon the extension or nose of the piston and seated in an annular recess provided in the head. Egress of fluid from the end is thus limited to the flow past the ring and to a conduit which connects the cylinder end with the groove or recess and may have additional throttling means to enable adjustment of the amount of cushioning. After the stroke has been completed, and the piston is to be returned, either as a recycling stroke or as a power stroke, fluid flows from the cylinder end past the nose and engages the outer face of the valve ring, lifting the same slightly off the annular groove or recess and thus relieving the pressure and permitting the fluid to flow past the ring to engage against the piston face and force the piston back.

The exact construction of the ring itself is of considerable importance to the invention and hence, same has been illustrated in considerable detail.

Referring now to the several figures of the drawings, since the outer configuration of the cylinder is fairly simple and well-known, no attempt has been made to illustrate the same. In Fig. 1 there is shown a cylinder which is designated generally by the character 10, and which is used to apply a power stroke of some kind to a machine or lever through the reciprocation of a piston rod 12 which extends out of the right hand end of the cylinder 10. The word "cylinder" has come to be used in the trade to designate the overall structure which includes the internal mechanism thereof, and some care should be taken in differentiating between the cylinder 10 as a power transmitting device, and the literal cylinder itself which is a cylindrical member between the ends of the device. Hereinafter this latter cylindrical member will be referred to as a tube for differentiation, and designated by the character 14.

The shaft or rod 12 is connected to some mechanism which is not shown herein, and a source of fluid with some valve means for controlling its flow and pressure is connected to the two ports 16 and 18. The port 16 may be designated the blind end port, and the port 18 may be designated the rod end port. During the stroke of the rod 12 from left to right, fluid pressure is applied by admitting the fluid to the port 16, the rod end port serving as an outlet. When the stroke is completed and it is desired to cause the rod 12 to move to the left, the rod end port 18 becomes the inlet and the blind end port 16 the outlet.

The fixed parts of the cylinder 10 in addition to the cylindrical tube 14 include a blind end cover or head 20 and a rod end cover or head 22 which must be provided with an opening 24 to enable reciprocation of the rod 12 therein. Suitable packing means are seated in an annular recess 26 formed in the rod end head 22 and comprise bushings 28 and packing members 30 compressed together and, together with a rod scraper 32, held in place by means of a snap ring 34 of any conventional construction. The tube 14 is held to the head by any suitable means, such as for example, internal keys 36, the construction and operation of which are well known in the industry. The juncture is sealed by means of the end cover O-rings 38 which are the usual type formed of rubber-like material, seated in suitable annular grooves 40 formed in the heads 20 and 22, and provided with non-extrusion rings 42. Obviously any other method of assembling the tube and heads, and any other methods of sealing the interior are capable of being used, since the exact structure of these parts is not material to the invention.

Each head has an end chamber formed therein, there being a blind end chamber 44 and a rod end chamber 46, the chambers providing communication between the respective ports and the interior of the cylinder 10.

A reciprocable piston designated generally 50 is mounted in the interior of the tube 14 adapted to be driven right or left by the fluid pressure applied thereto. The piston is here shown formed of two halves 52 and 54 arranged face to face and grooved to provide an annular recess for a bronze support ring 56 that provides anti-friction bearing surface for the piston during its course of movement within the interior of the tube 14. Suitable grooves are also provided on opposite sides of the support ring 56 to seat self adjusting piston-packing members 58 which prevent fluid from passing from one side of the piston 50 to the other during its movement. On opposite sides of the piston 50 are mounted the cushioning noses 60 and 62, the former being designated the front end nose and the latter the rear end nose. Both of the so-called noses are actually cylindrical bushings mounted in an assembly upon the left hand end of the piston rod 12. Their external structure is substantially the same, each being provided with a tapered end to facilitate the engagement thereof with the valve-ring in a manner to be described.

The rod 12 has a reduced diameter portion 64 upon which the front cushion nose 60 is seated in substantially fluid tight engagement. Axially of this portion 64 to the left is a further reduced diameter portion 66 upon which the piston 50 with its halves 52 and 54 are engaged, and in order to render this engagement fluid tight, grooves and packing members in the form of O-rings 68 are provided in said portion 66. The left hand end of the rod 12 is of further reduced diameter and threaded at 70, and a cushion retaining nut 72 is engaged thereon, the nut 72 having an elongate cylindrical shank upon which the rear cushion nose 62 is mounted. A pin 74 prevents the nut 72 from backing off the threaded end 70.

The inner surfaces of the heads 20 and 22 are engaged by the outer faces of the piston 50 with considerable impact at the ends of the strokes, and are thus formed to matingly engage surface to surface to prevent damage. These surfaces are formed in planes normal to the axis of the rod 12.

It will be noted that the diameter of the chambers 44 and 46 is somewhat greater than the diameter of the respective cushion noses which enter the same. This is best shown in the enlarged views of Figs. 2 and 3. The rear cushion nose 62 has a cylindrical portion designated 76 which is of uniform diameter throughout its extent, and an end tapered portion 78 that decreases in diameter toward the left end of the nose 62. A portion of the blind end head 20 is visible in said view and the lower extent of the chamber 44 can be seen. A broken line 80 has been extended from the uniform diameter portion of the rear nose 62 to show that there is an annular passageway 82 formed between the cushion nose 62 and the blind end chamber as the nose enters the chamber in the left hand movement of the piston 50.

An annular recess 84 of uniform diameter axially, is formed in the head 20 at the end thereof which opens toward the interior of the tube 14. A similar recess 86 is formed in the head 22. Since the structure on both ends of the cylinder 10 is substantially the same, the details are explained only with respect to the blind end.

Continuing with the description of the cushioning means, there is a valve ring 88 set into the recess 84, held in place by a flexible coiled spring 90 and a spiral retainer ring 92 set into a suitable groove adjacent the entrance to the annular recess 84. Any suitable spring or retainer may be used in place of these two described elements, the purpose being to prevent the ring 88 from coming out of the recess, to provide a short space for axial sliding of the ring, and to provide means for biasing the ring to seat in the bottom end of the recess. The bottom end of the groove is the shoulder formed between the recess 84 and the chamber 44 and is designated 94 in Figs. 2 and 3.

There is a duct 96 which extends from the recess 84 axially toward the blind end of the cylinder 10 and communicates with the chamber 44 by means of a radially extending duct 98 which meets the duct 96 at a valve seat engaged by a needle valve 100 formed on the inner end of a screw plug 102 adjustable from the exterior of the head 20. A packing ring 104 aids in retaining fluid. As will shortly be explained, the cushioning is achieved by relieving the fluid forced forward by the piston through the ducts 96 and 98. The amount of such cushioning is therefore controlled by the amount of throttling of the needle valve 100.

The ring 88 is slidably mounted in the recess 84 to accomplish the valve action which has been alluded to above.

The radially inner surface 106 of the ring is uniformly cylindrical and of a diameter relative to the portion 76 of the cushion nose such that when assembled there will be a tight fit. The ring is slidable along the cushion nose 62 notwithstanding such tight fit because of the material from which the same is made. Preferably the ring is molded from tetrafluorethylene, a synthetic plastic material which is highly impervious to decomposition by the fluids usually encountered in cylinders of this type. This material is fairly stiff but nonetheless somewhat flexible, enabling the diameter of the portion 106 to be made a few thousandths of an inch less than the diameter of the cylindrical portion 76 of the cushion nose 62 so that, in order to engage upon the same during the operation of the device, there will be slight stretching. The texture of tetrafluorethylene is rubbery and self lubricating, somewhat like nylon or fairly stiff rubber which is subjected to fluids such as water, oil, or hydraulic fluid, although no difficulty is encountered in cases where the cylinder is to be used only with air. Obviously the invention is not limited to the use of tetrafluorethylene, but this is preferred because of the many advantages accruing.

A circumferential flange 108 is formed on the ring, the outer diameter of which is the same as that of the recess 84 so that a sliding fit is obtained when the ring 88 is disposed in the recess. The flange has circumferentially spaced axially extending passages 110 uniformly arranged about the periphery to permit fluid to flow past the ring 88 during the operation of the cylinder 10. The rear side (facing away from the piston 50) of the ring 88 has an annular seat 112 formed thereon which extends axially rearward of the flange 108 by an amount equal to the width of the shoulder 114, the diameter of the seat being substantially less than the diameter of the outer flange 108, but substantially greater than the diameter of the inner surface 106. When the ring 88 is disposed at the very bottom of the recess 84, the surface of the seat 112 engaging against the bottom end 94, there is formed a confined annular space 116 which communicates with the duct 96. Under this condition, which is best shown in Fig. 2, the only way that fluid can escape from the front side of the ring 88 is through the passages 110, into the annular space 116, through the ducts 96 and 98 and into the chamber 44.

While the ring 88 can be made solid, in order to assure a slight stretching in applying the same and thereby securing a tight fit during movement of the piston 50 and as well to provide a pocket for catching fluid during the movement of the piston toward the front side of the ring 88, there is provided an undercut groove 118 in the front face of the ring. This serves substantially the same purposes as the grooves provided in the packing members 58, and gives rise to a thick stiff lip 120 adapted to slide upon the cushion nose 62. It enables wear on the surface 106 to be taken up as well.

The spring member 90 normally urges the ring 88 to the left if no other force is acting upon the ring 88, in an effort to seat the ring at the bottom of the recess 84. When the fluid is moving out of the chamber 44, and the ring 88 is translated to the right as viewed in the figures, the maximum extent of its movement is limited by the spring 90 and the retainer ring 92. The spring 90 could be eliminated, if desired, but is preferred. The front side of the ring 88 is thus engaged against some manner of stop device as shown in Fig. 3, and fluid is to flow from the rear side of the ring to its front side through the passageways 110 and find its way into the interior of the tube 14 to engage against the left face of the piston 50. When the depth of the passageways 110 is less than the extent to which the stop member protrudes into the recess 84, the fluid could be blocked at the inner face of the ring. Thus, note in the embodiment illustrated, the depth of the passageways 110, measured radially is less than the radial thickness of the spring 90 and hence, the ring 88 is provided with radial grooves 122 which may be located at each passageway 110. These grooves 122 extend from the passageways radially inward in the front face of the ring 88 to the undercut groove 118 and thereby eliminate any likelihood of the stop means blocking flow of fluid past the ring.

The rod end of the piston 50 has cushioning means substantially as described. Thus, there is a ring 88′ identical with the ring 88 except reversed in disposition, slidably mounted in the recess 86 held in place in the same manner as ring 88. The operation is identical and hence need not be independently described.

While it is felt that the invention should be understood from the above description, the following explanation of the manner in which the cushioning is accomplished may aid in a better understanding of the invention:

Assuming that the rod 12 is at the extreme right hand end of its stroke, the spring 90 attempts to seat the ring 88 in the recess 84 with the seat 112 against the bottom 94 of the recess. The port 16 is opened to serve as an outlet and fluid is admitted to the chamber 46 through the port 18 and exerts pressure against the right hand side of the piston 50. Now the piston is driven toward the blind head 20 by the force of the fluid pressure and commences to move within the tube to the left. The fluid which was disposed on the left hand side of the piston 50 freely moves into the chamber 44 and out of the port 16 until the cushion nose or extension 62 enters the entrance to the chamber 44. There is fluid partially trapped between the left hand face of the piston half 52 and the inner face of the head 20 which must now find its way through the restricted passageway 82 formed by the cushion nose 62 and the walls of the chamber 44.

As the tapered portion 78 enters the chamber 44, the clearance 82 immediately adjacent the entrance decrees rapidly as the cylindrical portion 76 rides into the exposed portion of the ring 88, engaging the inner surface 106 tightly, and further tightly seating the ring in the recess 84. Now the fluid between the piston half 52 and the inner face of the head 20 is completely contained as indicated at 125 in Fig. 2, which illustrates the condition at this point. The only way that this entrapped fluid can emerge from the interior of the tube 14 is past the ring 88 as shown by the arrows in Fig. 2. The fluid passes into the grooves 122, through the passageways 110 and into the annular space 116. The only egress from this space is by way of the duct 96 past the needle valve 100 to the chamber 44 by way of the duct 98.

Thus the throttling of the fluid after the cushion nose 62 enters the chamber 44 provides the desired cushioning, the extent of which is controlled by size of the ducts 96 and 98 and by adjustment of the needle valve 100.

Once the piston 50 has moved its full stroke to the left and it is desired to reciprocate the same in an opposite direction, the port 16 becomes an inlet for fluid, and the port 18 becomes an outlet. Fluid enters the chamber 44 and passes into the space 82, applying pressure against the rear face of the ring 88, at the same time that some fluid passes through the ducts 98 and 96 and through the passageways 110. Of course, the latter fluid applies very little pressure to the piston. The principal body of fluid unseats the ring 88 as shown in Fig. 3 and immediately passes the ring as shown by the arrows, by way of the now enlarged space 116, the passageways and the grooves 122 to apply pressure against the rear face of the piston 50 and move the same to the right. As soon as the cushion nose 62 has moved out of the chamber 44, the fluid pressure is applied to the piston without any throttling.

The cushioning means at the rod end of the cylinder 10 operates in precisely the same manner, relief for the fluid during cushioning being provided through the use of ducts 96′ and 98′, the degree of throttling during cushioning being adjustable also by a needle valve 100′.

The structure illustrated in Fig. 8 demonstrates that the invention is capable of modifications and variations which nevertheless use the salutary features and principles thereof. There is shown the blind end of a cylinder 200 which has cushioning means installed therein. The piston 202 and cushion nose end 204 are just entering the blind end chamber 206 at the entrance of which there is an annular recess 208 in which a ring 210 similar to rings 88 and 88′ is seated. Suitable spring and retainer means equivalent to those illustrated in Fig. 1 confine movement of the ring 210.

In this case, the ducts for throttling flow of fluid to the chamber are not connected with the bottom of the recess, as in the embodiment previously described. Duct 212 and/or duct 214 are simply holes drilled through the head 216 from the interior of the cylinder 200 to the chamber 206. These ducts, or one of them if only one is used, may or may not have a needle valve similar to 100 or 100′ for adjusting the amount of cushioning. The valve enables the cylinder to be used for different purposes requiring differing degrees of cushioning.

Since the fluid is not required to be relieved through the ring 210 on the end of the power stroke after the cushion nose 204 enters the chamber 206, there is no need for providing a space similar to the annular space 116 shown in Fig. 2, and the ring 210 therefore has no shoulder 114. The entire rear face serves as the seating means for the ring.

But for the changes mentioned above, the structure of cylinder 200 operates exactly as the structure of the cylinder 10.

It is again desired to point out that the structure is capable of being varied as to many details. For example, the rings 88, 88′ or 210 may be formed by stamping, or machining. The ring may be considered as having a plurality of circumferentially spaced teeth, not necessarily rectangular in cross-section, and the resulting passageways could well be formed circular, or arcuate. This is also true of the grooves 122. It should be understood that the grooves 122 need not be provided where the spring 90 does not block passageways 110. Fig. 9 shows a modified form of valve ring 220 in which the outer circumferential edge 222 is not toothed but is continuous, passage for fluid being provided by a series of circumferential holes 224 which are the equivalent of and serve the same purposes as the passageways 110 of ring 88. This ring 220 could be used in the structure of Fig. 8, the rear face 226 being flat and not providing any formation similar to means 112, and adapted to seat against the recess bottom over its entire extent. Also note that since the holes 224 may have a substantial cross sectional area exposed radially inward of the stop means 218, no radial grooves equivalent to grooves 122 are provided. If necessary, of course, they may be formed in ring 220. All of the rings 88, 88' and 220 could be described as axially foraminous, that is, having foramina or openings suitable for passing fluid in an axial direction through said ring.

What it is desired to secure by Letters Patent of the United States is:

1. In a power cylinder of the character described, a slidable cushioning valve member, comprising an annular ring formed of resinous semi-flexible material having fluid passageway means circumferentially spaced about the periphery thereof, a relatively thick lip formed on the inner circumference thereof, a fluid capturing groove adjacent said lip opening to one face of said member, the opposite face having valve seating means.

2. A structure as claimed in claim 1 in which the fluid passageway means comprise a plurality of axially disposed openings.

3. A structure as claimed in claim 1 in which the periphery of said member is toothed and said passageway means comprise the spaces between teeth.

4. A structure as claimed in claim 1 in which radial passageways are provided on said one face communicating between said fluid passageway means and said fluid capturing groove.

5. A check valve structure for cushioning the movement of a piston, said piston being reciprocably mounted in a tube and adapted to be actuated by fluid flow, a chamber connected with the tube at the end thereof and having egress and ingress means for the fluid while the piston is moving toward the chamber and away from the chamber, the piston having a reduced diameter nose end adapted to enter the chamber, and there being an annular recess at the entrance to the chamber of a diameter greater than the nose end but lesser than the diameter of the tube opening toward the tube and having a valve seat at its opposite end, said check valve structure comprising: an annular ring of partially flexible material having an internal diameter slightly less than that of said nose end and having a relatively stiff lip extending toward the piston whereby when the nose end is engaged in said ring, the lip will stretch to accommodate said nose end and there will be a fluid tight connection between said ring and said nose end regardless of the direction of fluid flow, having an external diameter providing a sliding fit in said recess, the axial end of said ring opposite said piston being formed to sealing engage against said valve seat, foraminous means extending axially through the ring at the circumference thereof, and said ring being axially slidable in said recess, the recess having stop means to prevent the ring from sliding out of the recess.

6. A check valve structure as claimed in claim 5 in which said ring is formed of tetrafluorethylene.

7. A check valve structure as claimed in claim 5 in which the ring has an annular groove opening toward said piston.

8. A check valve structure as claimed in claim 5 in which said ring has axially extending passageways to permit passage of fluid from the chamber to the tube past the ring when the ring is engaged against said stop means.

9. A check valve ring for use in a cylinder having a piston with a cushioning nose and the cushioning nose adapted to enter an end chamber of the cylinder and the ring adapted to be axially disposed in an open-ended annular recess between the chamber and the interior of the cylinder, said ring comprising: a resinous annular member having an annular axially extending hollow formation opening toward one end of the ring and giving rise to a relatively stiff axially extending lip, the internal diameter of the ring being such as to tightly engage upon the cushioning nose and the lip being relatively stiff so as to prevent escape of fluid past the ring at the nose but sufficiently flexible to accommodate slight eccentricity of said nose, the circumference of the ring being toothed and of a diameter to enable said ring to snugly slide in said recess, and the second end of said ring adapted to make valve seating engagement with the bottom end of said annular recess.

References Cited in the file of this patent

UNITED STATES PATENTS

| 2,661,019 | Snyder et al. | Dec. 1, 1953 |
| 2,701,119 | Smith | Feb. 1, 1955 |
| 2,704,996 | Peterson et al. | Mar. 29, 1955 |
| 2,710,595 | Peterson et al. | June 14, 1955 |
| 2,719,510 | Elder | Oct. 4, 1955 |
| 2,804,052 | Halladay et al. | Aug. 27, 1957 |
| 2,853,974 | Hewitt | Sept. 30, 1958 |